United States Patent
Funari (10) Patent No.: US 9,062,442 B2
(45) Date of Patent: *Jun. 23, 2015

(54) FLUSH ACTUATOR ASSEMBLY AND METHOD THEREFOR

(75) Inventor: Michael A. Funari, Apex, NC (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 223 days.

This patent is subject to a terminal disclaimer.

(21) Appl. No.: 12/353,569

(22) Filed: Jan. 14, 2009

(65) Prior Publication Data

US 2010/0006155 A1    Jan. 14, 2010

Related U.S. Application Data (63) Continuation of application No. 11/151,692, filed on Jun. 13, 2005, now Pat. No. 7,481,413.

(60) Provisional application No. 60/579,398, filed on Jun. 14, 2004.

(51) Int. Cl.
  *E03D 3/06*    (2006.01)
  *F16K 31/385*    (2006.01)

(52) U.S. Cl.
  CPC ............. *E03D 3/06* (2013.01); *F16K 31/3855* (2013.01)

(58) Field of Classification Search
  CPC ............................. F16K 31/3855; E03D 3/06
  USPC ............. 251/40, 229, 339, 234, 33, 38; 4/326
  See application file for complete search history.

(56) References Cited

U.S. PATENT DOCUMENTS

| | | | |
|---|---|---|---|
| 303,712 | A | 8/1884 | Demarest |
| 605,621 | A | 6/1898 | Acklin |
| 1,114,398 | A | 10/1914 | Sloan |
| 1,494,708 | A | 5/1924 | Reznicek |
| 1,519,654 | A | 12/1924 | Banta |

(Continued)

FOREIGN PATENT DOCUMENTS

| | | |
|---|---|---|
| JP | 08000325 | 1/1933 |
| JP | 08003587 | 8/1933 |

(Continued)

OTHER PUBLICATIONS

ASME A112.192-2003, "Vitreous China Plumbing Fixtures and Hydraulic Requirements for Water Closets and Urinals", The American Society of Mechanical Engineers, 2004, pp. i-viii and pp. 1-59.

(Continued)

*Primary Examiner* — Marina Tietjen
(74) *Attorney, Agent, or Firm* — The Webb Law Firm (57) ABSTRACT

A flush actuator assembly is adapted to fit existing valve bodies. The flush actuator assembly includes a plunger rod which is capable of displacing the relief valve post more or less to adjust the flow of water through the flush valve during a single flush. The relief valve post may be displaced different amounts by adjusting the actuator assembly such that the plunger rod contacts the relief valve post at different locations along the central longitudinal axis of the post. Additionally, the relief valve post may be displaced different amounts by providing a plunger rod that has a different range of travel. A method associated with displacing the relief valve post varying amounts is also disclosed.

7 Claims, 4 Drawing Sheets

(56) References Cited

U.S. PATENT DOCUMENTS

| | | |
|---|---|---|
| 1,610,683 A | 12/1926 | Kellan |
| 1,868,316 A | 7/1932 | Esterly |
| 1,868,520 A | 7/1932 | Brooks |
| 1,868,591 A | 7/1932 | Tanner |
| 1,896,950 A | 2/1933 | Groeniger |
| 1,912,937 A | 6/1933 | George |
| 2,038,135 A | 4/1936 | Sloan |
| 2,136,221 A | 11/1938 | Sloan |
| 2,164,760 A | 7/1939 | Wesson |
| 2,210,860 A | 8/1940 | Regnell |
| 2,255,322 A | 9/1941 | Langdon |
| 2,369,104 A | 2/1945 | Fredrickson |
| 2,472,576 A | 6/1949 | Dobrick |
| 2,612,187 A | 9/1952 | Romanelli et al. |
| 2,620,826 A | 12/1952 | Johns |
| 2,633,141 A | 3/1953 | Russell |
| 2,734,712 A | 2/1956 | Fraser |
| 2,738,946 A | 3/1956 | Filliung |
| 2,858,846 A | 11/1958 | Parker |
| 3,085,779 A | 4/1963 | Phililppe |
| 3,207,467 A | 9/1965 | Buhler |
| 3,279,742 A | 10/1966 | Billeter |
| 3,399,860 A | 9/1968 | Billeter et al. |
| 3,406,940 A | 10/1968 | Kertell |
| 3,594,828 A | 7/1971 | Seek |
| 3,695,254 A | 10/1972 | Blum |
| 3,778,023 A | 12/1973 | Billeter |
| 3,806,962 A | 4/1974 | Sievers |
| 4,022,380 A | 5/1977 | Scragg |
| 4,134,570 A | 1/1979 | Walker |
| 4,202,525 A | 5/1980 | Govaer et al. |
| 4,272,052 A | 6/1981 | Gidner |
| 4,327,891 A | 5/1982 | Allen et al. |
| 4,576,272 A | 3/1986 | Morgan, Jr. et al. |
| 4,817,913 A | 4/1989 | Whiteside |
| 4,883,254 A | 11/1989 | Whiteside |
| 4,893,645 A | 1/1990 | Augustinas et al. |
| 5,026,021 A | 6/1991 | Pino |
| 5,062,453 A | 11/1991 | Saadi et al. |
| 5,213,305 A | 5/1993 | Whiteside et al. |
| 5,244,179 A | 9/1993 | Wilson |
| 5,365,978 A | 11/1994 | Woods |
| 5,415,374 A | 5/1995 | Carroll et al. |
| 5,431,181 A | 7/1995 | Saadi et al. |
| 5,476,244 A | 12/1995 | Carroll et al. |
| 5,497,802 A | 3/1996 | Whiteside |
| 5,505,427 A | 4/1996 | Whiteside |
| 5,535,781 A | 7/1996 | Paterson et al. |
| 5,730,415 A | 3/1998 | Gronwick |
| 5,881,993 A | 3/1999 | Wilson et al. |
| 6,019,343 A | 2/2000 | Tsai |
| 6,056,261 A | 5/2000 | Aparicio et al. |
| 6,189,554 B1 | 2/2001 | Pino |
| 6,227,219 B1 | 5/2001 | Pino |
| 6,299,127 B1 | 10/2001 | Wilson |
| 6,408,873 B1 | 6/2002 | Hall et al. |
| 6,554,018 B1 | 4/2003 | Pino |
| 6,729,602 B2 | 5/2004 | Hankin, Jr. et al. |
| 6,785,913 B2 | 9/2004 | Ho |
| 6,905,108 B2 | 6/2005 | Hall et al. |
| 6,966,536 B2 | 11/2005 | Enomoto et al. |
| 2002/0047102 A1 | 4/2002 | Hankin et al. |
| 2003/0089867 A1 | 5/2003 | Hall et al. |
| 2006/0151729 A1 | 7/2006 | Wilson |
| 2006/0202141 A1 | 9/2006 | Perlstein |
| 2007/0210271 A1 | 9/2007 | Wilson |

FOREIGN PATENT DOCUMENTS

| | | |
|---|---|---|
| JP | 37022380 | 12/1933 |
| JP | 12011889 | 8/1937 |
| JP | 13003525 | 3/1938 |
| JP | 14010007 | 7/1939 |
| JP | 57085077 | 5/1982 |
| JP | 60000381 | 1/1985 |
| JP | 01040187 | 8/1989 |

OTHER PUBLICATIONS

ASME A112.19.14-2006, "Six-Liter Water Closets Equipped With a Dual Flushing Device", The American Society of Mechanical Engineers, 2006, pp. ii-vi and pp. 1-2.

Sloan Flush Valves, Catalog 32, "The Naval Flush Valve", p. 26, Installation Data, p. 40, Sloan Valve Company, Chicago, IL, USA.

Sloan Flush Valves, Catalog 40, "Naval", p. 26, Installation, p. 31, Sloan Valve Company, Chicago, IL.

Test data from 1987 test, Zurn Industries (6 pgs.).

E-mail communication dated Mar. 6, 2009, Zurn Industries (3 pgs.).

Zurn Industries, Inc.; Redacted drawing entitled "Handle Seal Retainer", drawing dated Sep. 12, 2000.

American Society of Mechanical Engineers, A112.19.14-2001, published Aug. 1, 2002.

Non-Final Office Action dated Jan. 10, 2011 issued in U.S. Appl. No. 90/009,826.

Amendment dated Oct. 21, 2009 regarding U.S. Appl. No. 95/001,187 in reply to USPTO Correspondence of Aug. 21, 2009 including and IDS, PTO/SB/08a, cited drawing, and Declaration under 37 CFR 1.132.

Third Party Requestor's response, dated Nov. 19, 2009, in response to the Oct. 21, 2009 amendment for Reexam Control No. 95/001,187, entitled "Flush Actuator Assembly and Method Therefor", which has been filed with respect to U.S. Patent No. 7,481,413.

Office Action Closing Prosecution, dated Oct. 28, 2011, for Reexam Control No. 95/001,187, which has been filed with respect to U.S. Patent No. 7,481,413, entitled "Flush Actuator Assembly and Method Therefor".

Petition under 37 C.F.R. §1.182 submitted in Reexam Control No. 95/001187 petitioning for entry of the Response After Action Closing Prosecution, dated Oct. 28, 2011.

Response dated Feb. 8, 2012, filed in related Canadian Patent Application No. 2,570,353, entitled "Flush Actuator Assembly and Method Therefor", which was filed in reply to the Office Action dated Aug. 9, 2011 issued by the Canadian Patent Office.

Right of Appeal Notice dated Feb. 27, 2012, for Re-exam Control No. 95/001,187, which has been filed with respect to U.S. Patent No. 7,481,413, entitled "Flush Actuator Assembly and Method Therefore".

Canadian Office Action dated Aug. 9, 2011 in connection with Canadian Application No. 2,570,353 which corresponds with U.S. Appl. No. 12/353,569, entitled "Flush Actuator Assembly and Method Therefor".

Claims 1-123, from Canadian Voluntary Amendment filed Apr. 1, 2011, Application No. 2,570,353, filed Jun. 14, 2005.

Comments under 37 C.F.R. §1.951(b) by Third Party Requestor, dated Jan. 6, 2012, which were filed in response to Patent Owner's response, dated Dec. 9, 2011.

FIG. 7

FLUSH ACTUATOR ASSEMBLY AND METHOD THEREFOR

CROSS-REFERENCE TO RELATED APPLICATIONS

This application is a continuation of U.S. patent application Ser. No. 11/151,692, filed Jun. 13, 2005 now U.S. Pat. No. 7,481,413, which claims priority to U.S. Patent Provisional Patent Application No. 60/579,398, filed Jun. 14, 2004, which are incorporated herein by reference in their entirety.

BACKGROUND OF THE INVENTION

1. Field of the Invention

The present invention relates in general to a flush valve for urinals and other plumbing equipment and, more particularly, to a flush actuator assembly utilized on a flush valve.

2. Description of Related Art

Figure 1:
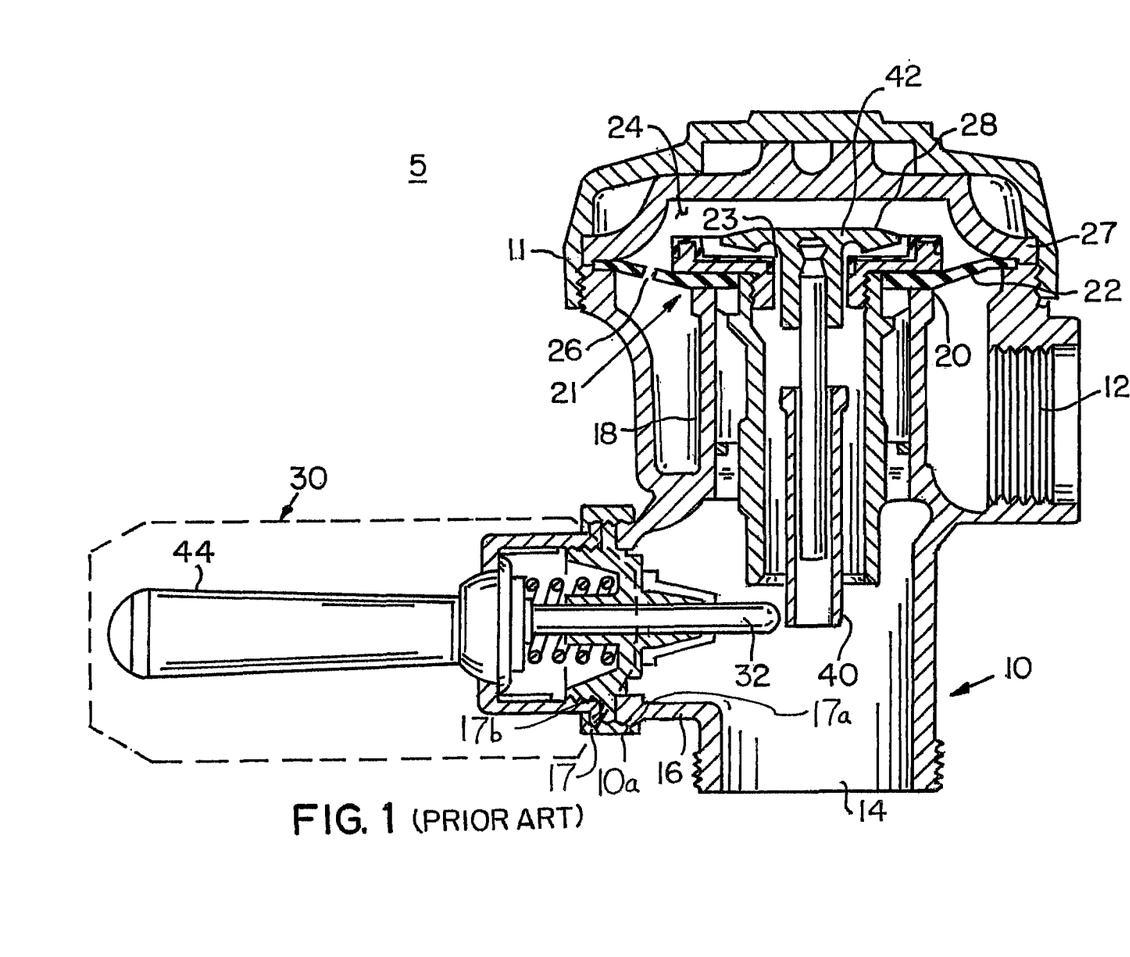
FIG. 1 is a partial sectional view of a prior art flush valve with a flush actuator assembly.

Flush valves in water closets, urinals and other plumbing devices which utilize a flexible diaphragm to establish and to seal off the connection between the inlet and outlet are well known in the art. FIG. 1 illustrates a typical prior art flush valve 5. The flush valve 5 has a valve body 10, generally made of brass, which includes an inlet 12 and outlet 14 and an actuator connection 16. A barrel section 18 is positioned within the flush valve 5 such that the connection between the inlet 12 and the outlet 14 is through the barrel section 18. A valve seat 20 is formed on a top or sealing end 21 of the barrel section 18. The valve seat 20 is normally closed by a diaphragm or movable sealing arrangement 22 extending across the body 10 and defining an upper chamber 24. The diaphragm 22 has a by-pass 26 which provides fluid communication between the inlet 12 of the flush valve 5 and the upper chamber 24. The diaphragm 22 is attached at its outer edge to the valve body 10 and is clamped in place by an annular clamping rim 27 on an upper cover 11 of the body 10. The diaphragm 22 has a central opening 23 which allows for fluid communication between the upper chamber 24 and the outlet 14. A relief valve 28 normally closes the central opening 23 of the diaphragm 22.

The operation of the flush valve 5 is generally as follows. In the normally closed position shown in FIG. 1, water pressure in the valve inlet 12 is communicated to the upper chamber 24 through the by-pass 26 defined in the diaphragm 22. Because the surface area which is subjected to water pressure is greater on the upper side of the diaphragm 22, the water pressure forces the diaphragm 22 down onto the sealing end 21 of the barrel section 18 (i.e., valve seat 20), thus preventing water from flowing to the outlet 14. A flush actuator assembly 30 is attached to the valve body through the actuator connection 16 and moves a plunger rod 32 inwardly which contacts and displaces a relief valve post 40 of the relief valve 28 which then displaces from the valve seat 20 a valve seat seal 42 connected to the post 40. A nut 17 with a threaded portion 17a may be mated with a threaded portion 10a of the body 10 at the actuator connection 16. The nut 17 has a shoulder 17b which captures and urges the flush actuator assembly 30 against the body 10.

This releases the pressure in the upper chamber 24 by allowing water to flow through the central opening 23 of the diaphragm 22 to the outlet 14. After the diaphragm 22 and the relief valve 28 move upwardly, the relief valve 28 resets itself thereby causing the valve seat seal 42 to cover the valve seat 20, thereby closing off the upper chamber 24 except for the passageway provided by the by-pass 26. Water then flows then flow through the by-pass 26 into the upper chamber 24 until the diaphragm 22 is again forced against the valve seat 20, thereby closing the valve. The flush actuator assembly 30 includes a drive mechanism such as a handle 44 or another device capable of displacing the plunger rod 32 against the relief valve post 40, including a motor or solenoid well known to those skilled in the art of flush valve designs.

With a focus on water conservation, valve designers are now exploring modifications to flush valves to more closely adjust and control the quantity of water passing through the flush valve for each flush.

Therefore, it is desirable to provide a mechanism capable of adjusting and controlling the quantity of water through a flush valve for each individual flush.

SUMMARY OF THE INVENTION

In one embodiment, a flush actuator assembly for use with a flush valve comprises a base having a bore extending therethrough, wherein the base has a central longitudinal axis. The assembly also has a plunger rod having a central longitudinal axis, wherein the plunger rod is positioned within and guided by the bore of the base. A drive mechanism moves the plunger rod back and forth within the bore, and the base central longitudinal axis is offset from the plunger rod central longitudinal axis.

In another embodiment, a flush valve includes such a flush actuator assembly.

Yet another embodiment of the subject invention is directed to a method of adjusting the fluid flow through a flush valve by providing a valve body with an inlet and an outlet, a valve seat formed in the body between the inlet and outlet, and a flexible diaphragm above the valve seat defining a lower chamber in fluid communication with the inlet and an upper chamber, wherein in a closed position the diaphragm is urged against and seals the valve seat and wherein in an open position the diaphragm is relaxed and spaced from the valve seat such that the inlet is in fluid communication with the outlet. The valve further has a diaphragm bypass between the upper and lower chambers, whereby fluid from the inlet passes into the upper chamber and pressurizes the upper chamber to urge the diaphragm into the closed position. A relief valve relieves pressure from the upper chamber, thereby allowing the diaphragm to displace from the valve seat to provide fluid communication between the inlet and the outlet. The relief valve is comprised of a valve seat seal and a post extending therefrom. A plunger rod having a central longitudinal axis is positioned within and guided by the bore of the base and the plunger rod is positioned adjacent and transverse to the relief valve post. The relief valve post is displaced varying amounts to open the relief valve to varying degrees thereby permitting more or less water to flow through the valve during a flush cycle.

DETAILED DESCRIPTION OF THE INVENTION

It has long been known that the flush duration of a flush valve is directly affected by the length of time in which the relief valve within the flush valve is open. Some prior art flush valve designs have included an adjustable screw in the cap of the flush valve body which protrudes through the body and limits the distance the relief valve seal of the relief valve may separate from the valve seat. However, directing attention to FIG. 1, it has been discovered that the position the plunger rod 32 contacts the relief valve post 40 along the length of the post 40 determines how far the valve seat seal 42 separates from the valve seat 20. In particular, and directing attention to FIG. 2A, when the plunger rod 32 moves to the right a distance of X, the relief valve post 40 is laterally displaced and the valve seat seal 42 pivots upon the valve seat 20 such that a portion of the valve seat seal 42 continues to contact the valve seat 20 while an opposing portion of the valve seat seal 42 pivots away from the valve seat 20 to create a gap Y. Directing attention to FIG. 3A, given the identical relief valve post 40 having a valve seat seal 42 which rests upon the valve seat 20 and, furthermore, a plunger rod 32 designed to travel to the right a distance X against the relief valve post 40, if the point of contact of the plunger rod 32 is higher up along the relief valve post 40, then the valve seat seal 42 on the side opposite the pivot will separate from the valve seat 20 to create a gap of Y+Δ, wherein Δ is the additional separation produced by moving the position of plunger rod 32 further up along the relief valve post 40. As will be discussed further, the plunger rod 32 may be mounted in an eccentric fashion such that the flush actuator assembly 30 may be selectively adjusted on the flush valve body 10 to determine, within a range, the vertical position at which the plunger rod 32 will contact the relief valve post 40.

Figure 3A:
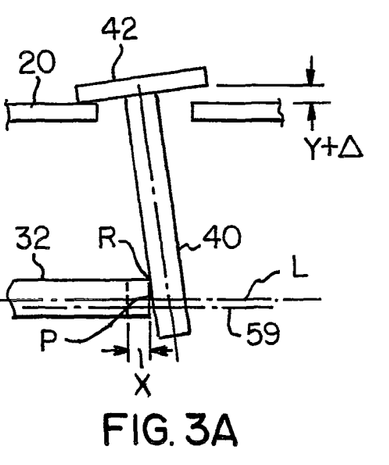
FIG. 3A is a schematic drawing illustrating the displacement of the relief valve with the plunger rod oriented in a second position.
Figure 4A:
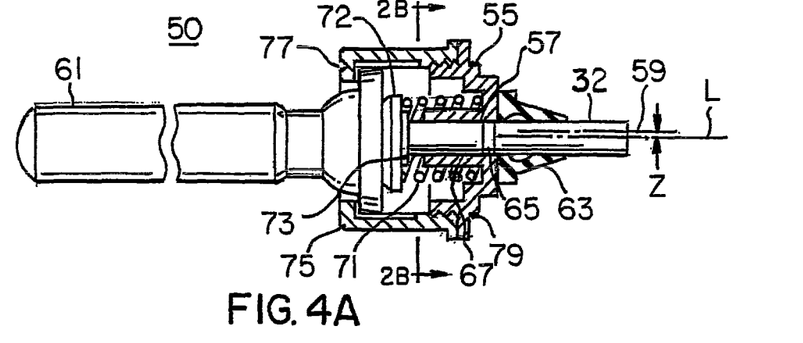
FIG. 4A is a sectional view of a flush actuator assembly in accordance with the subject invention.

Directing attention to FIG. 4A, a flush actuator assembly 50, for use with a flush valve, is comprised of a base 55 having a bore 57 extending therethrough, wherein the base 55 has a central longitudinal axis 59. The plunger rod 32 has a central longitudinal axis L and the plunger rod 32 is positioned within and guided by the bore 57 of the base 55. The assembly 50 furthermore has a drive mechanism for moving the plunger rod 32 back and forth within the bore 57. One such drive mechanism may be a flush handle 61. Of particular importance in this design is the fact that the axis 59 of the base 55 is offset from the central longitudinal axis L of the plunger rod 32 by a distance Z. By offsetting the plunger rod 32 within the base 55, the base 55 may be rotated such that the vertical position along the relief valve post 40 (FIGS. 2A and 3A) at which the plunger rod 32 contacts the relief valve post 40 may be varied and, as a result, the separation distance Y between the valve seat seal 42 and the valve seat 20 may be adjusted. The plunger rod 32 can be made of metal or a polymeric material such as plastic.

The flush actuator assembly 50 illustrated in FIG. 4A may be interchangeable with the prior art flush actuator 30 illustrated in FIG. 1. Each flush actuator assembly 30, 50 may be secured to the body 10 by a nut 17 threadably mated with the body 10. Furthermore, the flush actuator assembly 50 may be easily adapted to mount upon any number of commercial flush valve and provide the same benefit in adjusting the flow of water through the valve during a flush.

A typical flush actuator assembly 30 (FIG. 1) is secured to an actuator connection 16 extending through the valve body 10 and, as a result, the flush actuator assembly 30 acts to seal water within the valve body 10. Directing attention to the flush valve assembly 50 illustrated in FIG. 4A, a sealing sleeve 63 made of a resilient material, such as a thermoplastic elastomer, is attached to the base 55 and fits over the plunger rod 32 to provide a fluid seal. Additionally, an O-ring 65 is located within a recess 67 about the plunger rod 32 within the bore 57 of the base 55 to further prevent water from leaving the valve body 10 through the flush actuator assembly 50. The flush actuator assembly 50 illustrated in FIG. 4A is a relatively standard part but, as mentioned, the plunger rod 32 of the flush actuator assembly 50 has a central longitudinal axis L passing therethrough. The plunger rod is offset by an amount Z from the central longitudinal axis 59 extending through the base 55. As a result, the flush actuator assembly 50 may be mounted to the body 10 of the flush valve 5 so that the offset Z may be oriented in any desired direction by rotating the assembly 50 within the valve body 10.

Figure 2A:
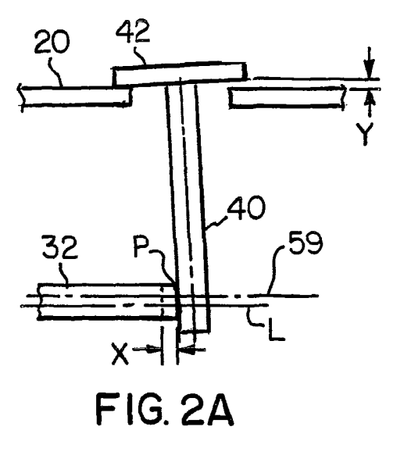
FIG. 2A is a schematic drawing illustrating the displacement of the relief valve with the plunger rod oriented in one position.
Figure 2B:
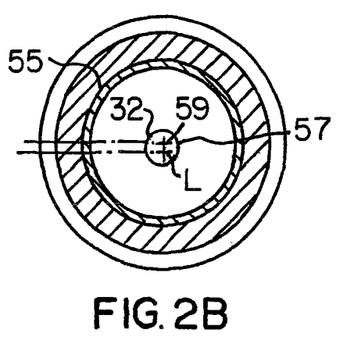
FIG. 2B is an end view of the valve base with the plunger rod positioned therein and viewed along arrows "2B-2B" in FIG. 4.
Figure 3B:
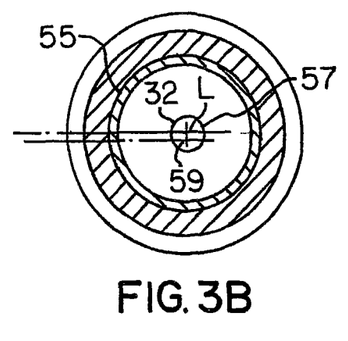
FIG. 3B is an end view of the valve base with the plunger rod positioned therein and similar to the view of FIG. 2B but rotated 180 degrees.

For example, briefly directing attention to FIGS. 2A-2B and 3A-3B, FIGS. 2A and 3A are sketches of the relief valve post 40 displaced to differing degrees by the plunger rod 32. FIG. 2B is a cross-sectional view along lines "2B-2B" of FIG. 4A showing the relative location of the plunger rod 32 within the base 55. In FIG. 2B, the base 55 has a central longitudinal axis 59, while the plunger rod 32 has a central longitudinal axis L which contacts the relief valve post 40 at point P (FIG. 2A). The central longitudinal axis L of the plunger rod 32 is below the central longitudinal axis 59 of the base 55. FIG. 3B is a cross-sectional view similar to FIG. 2B but the base 55 is now rotated 180° such that the central longitudinal axis L of the plunger rod 32 is above the central longitudinal axis 59 extending through the base 55. As a result the plunger rod 32 contacts the relief valve post 40 at a point R above point P. It can be appreciated that the base 55 may be rotated less than 180°, thereby providing intermediate results to those found in FIGS. 2A and 3A.

Figure 4B:
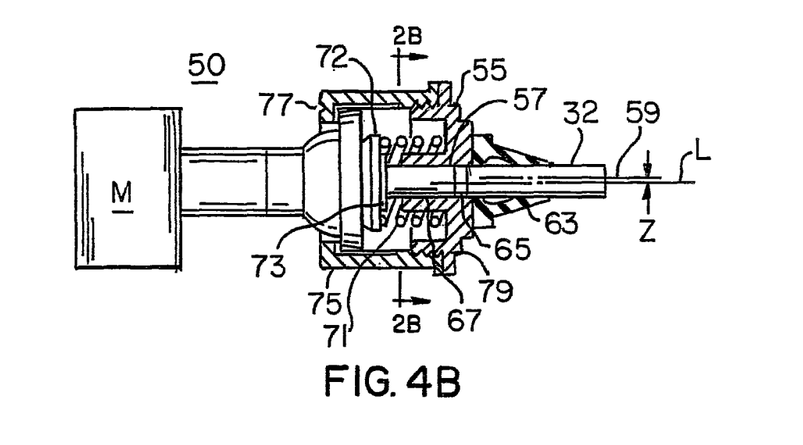
FIG. 4B is a sectional view of the flush actuator assembly shown in FIG. 4A having a different drive mechanism.

Returning to FIG. 4A, the flush actuator assembly 50 for moving the plunger rod 32 may be a flush handle 61 mounted to the base 55 which, when moved, displaces the plunger rod 32 within the base bore 57. As previously mentioned, in lieu of the flush handle 61 for moving the plunger rod 32, FIG. 4B shows a motor M such as a solenoid operating upon and physically displacing the plunger rods 32 in the same fashion as the handle 61 may be used. A motor operating on the flush handle 61 (not shown) may also be used.

Figure 7:
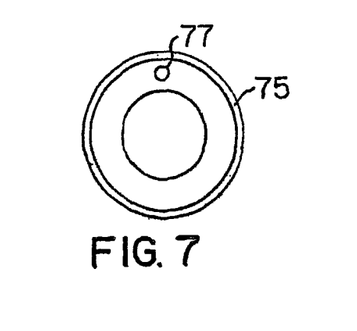
FIG. 7 is an end view of the other casing of the flush valve actuator marked to identify the orientation of the plunger rod.

The flush actuator assembly 50 further includes a spring 71 between the base 55 and a first end 73 of the plunger rod 32 to bias the plunger rod 32 in a retracted position. The spring 71 acts against a plunger rod head 72 at the first end 73 of the plunger rod 32. The flush actuator assembly 50 further includes an outer casing 75 marked to identify the offset orientation of the plunger rod 32 within the base 55. In FIG. 4A, a notch 77 is imparted to the outer casing 75 to identify the orientation of the base 55. FIG. 7 furthermore illustrates such a notch 77 in the outer casing 75 of the flush actuator assembly 50. The notch 77 is disposed on and, at all times, is non-movable relative to the outer casing on an external surface of the outer casing 75. In this embodiment, the notch 77 does not extend completely through the outer casing 75.

Figure 5:
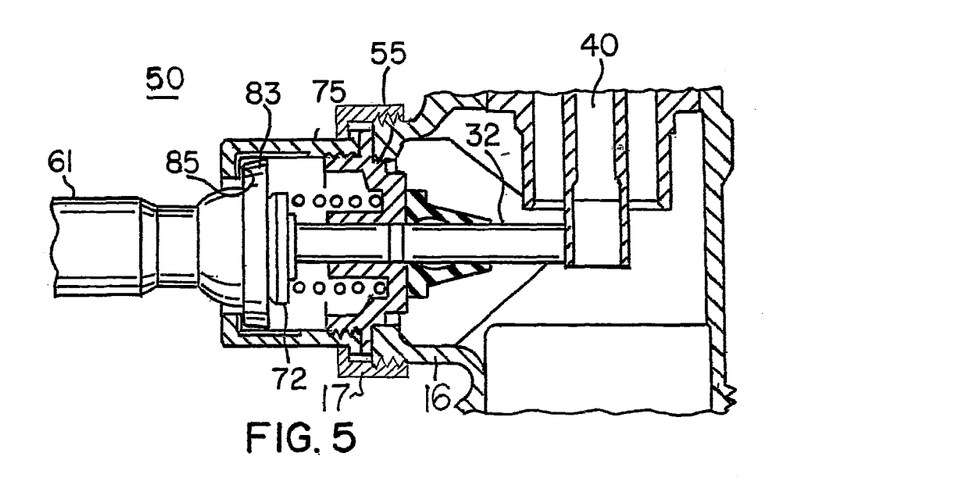
FIG. 5 is a cross-section view of the flush valve actuator illustrated in FIG. 4A in a relaxed position and mounted to a valve body.
Figure 6:
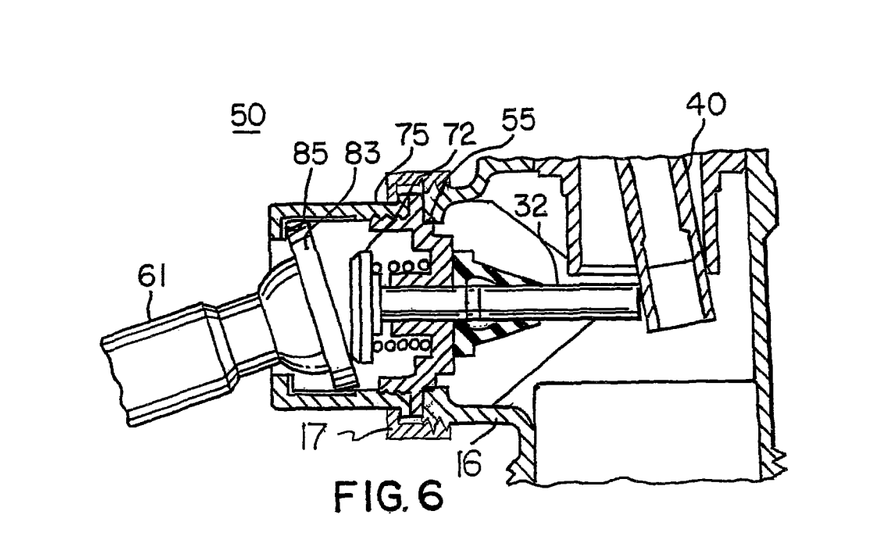
FIG. 6 is a cross-section view of the flush valve actuator illustrated in FIG. 4A in a flush position and mounted to a valve body.

As illustrated in FIG. 4A, the base 55 includes an end portion 79 that is threaded to be compatible with matching threads (not shown) on the actuator connection 16 (FIG. 1) of the valve body 10. In the alternative, the base 55 may include an end portion 79 adapted to snap within the actuator connection 16 in the valve body 10. In a further alternative, as illustrated in FIGS. 1, 5 and 6, a nut 17 with a threaded portion 17a may be mated with a threaded portion 10a on the valve body 10 at the actuator connection 16. The nut 17 has a shoulder 17b which captures and urges the flush actuator assembly 30 against the body 10.

FIGS. 5 and 6 illustrate the actual operation of the flush valve assembly 50 upon a relief valve post 40, for which a lower portion of the post 40 is illustrated in these figures. The flush valve handle 61 includes at one end an enlarged portion 83 that is captured by a shoulder 85 in the outer casing 75. The plunger rod head 72 is urged against the enlarged portion 83 of the handle 61. When the handle 61 is displaced in a first direction, the enlarged portion 83 pivots against the shoulder 85 of the outer casing 75, thereby pushing the plunger rod 32 toward the relief valve post 40. The displacement of the handle 61 is limited by the maximum travel of the plunger rod 32 since the plunger rod head 72 bottoms out against the base 55. In that respect, the maximum displacement of the relief valve post 40 is predetermined by maximum travel at the plunger rod 32. Additionally, the magnitude of the displacement of the relief valve post 40 directly affects the volume of water passing through the valve 5 during a single flush cycle. In particular, the greater the magnitude of the relief valve post 40 displacement, the greater the volume of water passing through the valve 5 during a flush cycle.

It should be appreciated that while the throw of the plunger rod 32 may be altered by moving the handle 61 a distance less than its maximum travel, the subject invention is based upon adjusting the displacement of the relief valve post 40 when the handle 61 during normal operation is extended to its maximum travel, or in the alternative, when a motor or solenoid, during normal operation, are operated to their maximum travel. By "throw" is meant the displacement or distance the plunger rod 32 travels after being moved by the drive mechanism.

When the central longitudinal axis 59 within the base 55 is offset from the central longitudinal axis L of the plunger rod 32 by between 0.01 inches and 0.04 inches, for example 0.025 inches, then the vertical position of the plunger rod 32 on the relief valve post 40 may be adjusted such that, the volume of water passing through the valve body 10 during a single flush may be altered by up to a gallon. The magnitude of the displacement of the relief valve post 40 may be adjusted by positioning the plunger rod 32 so that it contacts the relief valve post 40 at different locations along the length of the post 40. The valve 5 may be tested with the plunger rod 32 positioned at different vertical locations along the relief valve post 40 to determine at a given pressure or pressures the volume of water which passes through the valve 5. It is possible to alter the contact location of the plunger 32 with the post 40 and thereby adjust the volume of water flowing through the valve 5 in a flush cycle by rotating the collar 75 a certain amount. Directing attention to FIG. 7, the notch 77 acts as external indicia to indicate the rotational position of the collar 75 and, therefore, the vertical offset of the plunger rod 32. Therefore the valve could be calibrated using the rotational position of the collar 75 as indicated by the notch 77.

Furthermore, depending upon the piping system to which the valve 5 is connected, the inlet pressure may range from 40-120 psi. Under these circumstances, the volume of water passing through the valve 5 would depend upon the inlet pressure. If high inlet pressure produced an excessive volume of water through the valve 5, then the collar 75 could be rotated to shorten the flush cycle and therefore reduce the volume of water per flush cycle. In the alternative, if low inlet pressure produced an insufficient volume of water through the valve 5, then the collar 75 could be rotated to extend the flush cycle and therefore increase the volume of water per flush cycle. It can be appreciated that the directional movement of the handle, i.e. up versus down, affects the volume of water to be released. In particular, it is known that flush valves have a variance in flush volume whether the handle is raised or lowered because the plunger rod inherently has a diameter less than the bore hole of the base. This variance is a result of the striking location of the plunger rod with respect to the relief valve post. In other words, upward movement of the handle causes the plunger to strike the relief valve post at a first location to release a first volume of water and downward movement of the handle causes the plunger to strike the relief valve post at a second location. The first location is at a position that is lower on the relief valve post than the second location. As such, movement of the handle in an upward direction results in the release of less volume of water than movement of the handle in a downward direction.

While what has so far been described is the flush actuator assembly 50, it should be appreciated that the invention may further include a flush valve which incorporates the flush actuator assembly described herein.

Furthermore, another embodiment of the subject invention is directed to a method of adjusting fluid flow for a flush valve by providing a flush valve having a plunger rod 32 with a central longitudinal axis L, wherein the plunger rod 32 may be used to displace the relief valve post 40 varying amounts to open the relief valve 28 to varying degrees, thereby permitting more or less water to flow through the valve during a flushing cycle. In particular, the step of displacing the relief valve post 40 varying amounts may be comprised of positioning the plunger rod 32 at different locations along the length of the relief valve post 40 and advancing the plunger rod 32 such that the displacement at the bottom of the relief valve post 40 will open a relief valve a lesser amount than the same displacement at a position away from the bottom of the relief valve post 40.

From the discussion so far, it should be apparent that the lateral displacement of the relief valve post 40 is a feature of the subject invention and this displacement has been varied by altering the location in which the plunger rod 32 contacts the relief valve post 40. The range of travel of the plunger rod 32 has been constant. However, it should be appreciated that another technique for displacing the relief valve post varying amounts would be to adjust the throw of the plunger rod 32 such that the maximum range of travel may be greater or lesser, thereby once again varying the displacement of the relief valve post 40. The throw of the plunger rod 32 may be altered by changing the length of the bore 57 extending to the base 55 such that the plunger rod 32 bottoms out after traveling a specified distance. The range of travel of the plunger rod 32 can range from 0.15 inches to 0.35 inches, preferably 0.2580 inches. However, there may be other mechanisms available for altering the displacement of the relief valve post 40 and it is this general concept of displacing the relief valve post by varying amounts to which one embodiment of the invention is directed.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A flush actuator assembly for use with a flush valve having a relief valve post comprising:
   a) a base having a bore extending therethrough, wherein the base has a central longitudinal axis, said base including external threads;
   b) a plunger rod having a central longitudinal axis passing therethrough, wherein the plunger rod is positioned within and guided by the bore of the base;
   c) a movable handle for moving the plunger rod within the bore, the movable handle mounted to the base which, when the handle is moved, displaces the plunger rod within the bore, said handle comprising a face plate that coacts with the plunger rod and wherein the handle is pivotable causing the face plate to pivot and coact with the plunger rod;
   d) an outer casing threadably secured to the external threads of said base;
   e) visual indicia disposed on and, at all times, non-movable relative to the outer casing on an external surface of said outer casing, wherein during installation of said flush actuator assembly, said visual indicia identifies a non-axisymmetric orientation of the bore relative to the base central axis passing through the plunger rod, wherein the orientation of the bore relative to the base central axis is indicative of a volume of water passing through the flush valve for a flush cycle when the handle is moved in a first direction and wherein the indicia permits an assembler to orient the bore relative to the relief valve post; and
   f) wherein the bore has a bore central longitudinal axis that is offset from the central longitudinal axis of the base passing through the plunger rod and wherein the offset of the bore central longitudinal axis from the base central longitudinal axis is between 0.01 and 0.04 inches.

2. A flush valve comprising:
   a) a valve body having an inlet and an outlet;
   b) a valve seat formed in the body between the inlet and outlet;
   c) a movable valve seal above the valve seat defining a lower chamber in fluid communication with the inlet and an upper chamber, wherein in a closed position the seal is urged against and seals the valve seat and wherein in an open position the seal is spaced from the valve seat such that the inlet is in fluid communication with the outlet;
   d) by-pass between the upper and lower chambers, whereby fluid from the inlet passes into the upper chamber and pressurizes the upper chamber to urge the movable valve seal into the closed position;
   e) a relief valve to relieve pressure from the upper chamber, thereby allowing the movable valve seal to displace from the valve seat to provide fluid communication between the inlet and the outlet, wherein the relief valve is comprised of a valve seat seal and a post longitudinally extending therefrom;
   f) a flush actuator assembly mounted upon the valve body to displace the relief valve post comprising:
      1) a base having a bore extending therethrough, wherein the base has a central longitudinal axis, wherein the base is secured to the valve body and wherein said base includes external threads;
      2) a plunger rod having a central longitudinal axis of the base passing therethrough, wherein the plunger rod is positioned within and guided by the bore of the base and wherein the plunger rod is positioned adjacent and transverse to the relief valve post;
      3) a movable handle for laterally moving the plunger rod within the bore, the movable handle mounted to the base which when the handle is moved displaces the plunger rod within the base bore and said handle comprises a face plate that coacts with the plunger rod and wherein the handle is pivotable causing the face plate to pivot and coact with the plunger rod;
      4) an outer casing threadably secured to the external threads of said base; and
      5) visual indicia disposed on and, at all times, non-movable relative to the outer casing on an external surface of said outer casing wherein during installation of said flush actuator assembly, said visual indicia identifies a non-axisymmetric orientation of the bore relative to the base central axis passing through the plunger rod such that the base may be positioned upon the valve body so that the plunger rod can contact the relief valve post at different locations along the post thereby displacing the relief valve differing amounts and altering the volume of water passing through the valve for a flush cycle, when the handle is displaced in a first direction;
   g) wherein the base may be positioned in different angular positions upon the valve body; and
   h) wherein the bore has a central longitudinal axis and the base has a central longitudinal axis and wherein the bore central longitudinal axis from the base central longitudinal axis are offset between 0.01 and 0.04 inches.

3. A method of adjusting the fluid flow through a flush valve comprising:
   a) providing a flush valve comprising:
      1) a valve body having an inlet and an outlet;
      2) a valve seat formed in the body between the inlet and outlet;
      3) a movable valve seal above the valve seat defining a lower chamber in fluid communication with the inlet and an upper chamber, wherein in a closed position the seal is urged against and seals the valve seat and wherein in an open position the-seal is spaced from the valve seat such that the inlet is in fluid communication with the outlet;
      4) a by-pass between the upper and lower chambers, whereby fluid from the inlet passes into the upper chamber and pressurizes the upper chamber to urge the movable valve seal into the closed position;
      5) a relief valve to relieve pressure from the upper chamber, thereby allowing the movable valve seal to displace from the valve seat to provide fluid communication between the inlet and the outlet, wherein the relief valve is comprised of a valve seat seal and a post longitudinally extending therefrom; and
      6) a flush actuator assembly mounted upon the valve body to displace the relief valve post comprising:
         i) a base having a bore extending therethrough, wherein the base has a central longitudinal axis, wherein the base is secured to the valve body and wherein the base includes external threads;

ii) a plunger rod having a central longitudinal axis passing therethrough, wherein the plunger rod is positioned within and guided by the bore of the base and wherein the plunger rod is positioned adjacent and transverse to the relief valve post;

iii) a movable handle for laterally moving the plunger rod to contact and displace the relief valve post thereby opening the relief valve wherein the movable handle is mounted to the base which, when the handle is moved, displaces the plunger rod within the bore, said handle comprising a face plate that coacts with the plunger rod and wherein the handle is pivotable causing the face plate to pivot and coact with the plunger rod;

(iv) an outer casing threadably secured to the external threads of said base; and (v) visual indicia disposed on and, at all times, non-movable relative to the outer casing on an external surface of said outer casing wherein during installation of said flush actuator assembly, said visual indicia identifies a non-axisymmetric orientation of the bore relative to the base central axis passing through the plunger rod such that the base may be positioned upon the valve body so that the plunger rod contacts the relief valve post at different locations of the post thereby displacing the relief valve differing amounts and altering the volume of water passing through the valve for-a flush cycle when the handle is displaced in a first direction;

b) adjusting the position of where the plunger rod contacts the relief valve based upon a position of the visual indicia; and c) wherein the base may be positioned in different angular positions upon the valve body; and d) wherein the bore has a central longitudinal axis and the base has a central longitudinal axis and wherein the bore central longitudinal axis from the base central longitudinal axis are offset between 0.01 and 0.04 inches.

4. A flush actuator assembly for use with a flush valve comprising:

a) a base having a bore extending therethrough, wherein the base has a central longitudinal axis, said base including external threads;

b) a plunger rod having a central longitudinal axis passing therethrough, wherein the plunger rod is positioned within and guided by the bore of the base, wherein the base and associated bore are rotatable for redirecting the travel of the plunger rod;

c) a movable handle for moving the plunger rod back and forth within the bore wherein the movable handle is mounted to the base which, when the handle is moved, displaces the plunger rod within the bore and said handle comprises a face plate that coacts with the plunger rod and wherein the handle is pivotable causing the face plate to pivot and coact with the plunger rod;

d) an outer casing threadably secured to the external threads of said base; and e) visual indicia disposed on and, at all times, non-movable relative to the outer casing on an external surface of said outer casing wherein during installation of said flush actuator assembly, said visual indicia identifies a non-axisymmetric orientation of the bore relative to the base central axis passing through the plunger rod, said visual indicia disposed to enable adjustment of the volume of water passing through the flush valve for a flush cycle when the handle is displaced in a first direction; and f) wherein the bore has a central longitudinal axis and the base has a central longitudinal axis and wherein the bore central longitudinal axis from the base central longitudinal axis are offset between 0.01 and 0.04 inches.

5. A flush actuator assembly for use with a flush valve comprising:

a) a base having a bore extending therethrough, wherein the base has a central longitudinal axis, said base including external threads;

b) a plunger rod having a central longitudinal axis passing therethrough, wherein the plunger rod is positioned within and guided by the bore of the base;

c) a movable handle for moving the plunger rod back and forth within the bore wherein the movable handle is mounted to the base which when the handle is moved displaces the plunger rod within the bore and said handle comprises a face plate that coacts with the plunger rod and wherein the handle is pivotable causing the face plate to pivot and coact with the plunger rod;

d) an outer casing threadably secured to the external threads of said base; and e) visual indicia disposed on and, at all times, non-movable relative to the outer casing on an external surface of said outer casing wherein during installation of said flush actuator assembly, said visual indicia identifies a non-axisymmetric orientation of the bore relative to the base central axis passing through the plunger rod, wherein the base is adjustable about the central longitudinal axis of the base to modify the travel of the plunger rod and wherein the visual indicia is disposed to enable adjustment of the volume of water passing through the flush valve for a flush cycle when the handle is displaced in a first direction;

f) wherein the base is angularly adjustable about the central longitudinal axis of the base; and g) wherein the bore has a central longitudinal axis and the base has a central longitudinal axis and wherein the bore central longitudinal axis from the base central longitudinal axis are offset between 0.01 and 0.04 inches.

6. A flush valve comprising:

a) a valve body having an inlet and an outlet;

b) a valve seat formed in the body between the inlet and outlet;

c) a movable sealing arrangement above the valve seat defining a lower chamber in fluid communication with the inlet and an upper chamber, wherein in a closed position the movable sealing arrangement is urged against and seals the valve seat and wherein in an open position the movable sealing arrangement is spaced from the valve seat such that the inlet is in fluid communication with the outlet;

d) a relief valve to relieve pressure, thereby allowing the movable sealing arrangement to displace from the valve seat to provide fluid communication between the inlet and the outlet, wherein the relief valve is comprised of a valve seat seal and a post longitudinally extending therefrom; and e) a flush actuator assembly mounted upon the valve body to displace the relief valve post comprising:

1) a base having a bore extending therethrough, wherein the base has a central longitudinal axis, wherein the base is secured to the valve body and wherein the base includes external threads;

2) a plunger rod having a central longitudinal axis passing therethrough, wherein the plunger rod is positioned within and guided by the bore of the base and wherein the plunger rod is positioned adjacent and transverse to the relief valve post;
3) a movable handle for laterally moving the plunger rod to contact and displace the relief valve post thereby opening the relief valve, wherein the movable handle is mounted to the base which when moved displaces the plunger rod within the bore and wherein said handle comprises a face plate that coacts with the plunger rod and the handle is pivotable causing the face plate to pivot and coact with the plunger rod; and
4) an outer casing threadably secured to the external threads of said base; and
5) visual indicia disposed on and, at all times, non-movable relative to the outer casing on an external surface of said outer casing wherein during installation of said flush actuator assembly, said visual indicia identifies a non-axisymmetric orientation of the bore relative to the base central axis passing through the plunger rod such that the base may be positioned upon the valve body so that the plunger rod contacts the relief valve post at different locations along the post when the handle is displaced in a first direction thereby displacing the relief valve differing amounts and altering the volume of water passing through the valve for each flush cycle;
f) wherein the base may be positioned in different angular positions upon the valve body; and
g) wherein the bore has a central longitudinal axis and the base has a central longitudinal axis and wherein the bore central longitudinal axis from the base central longitudinal axis are offset between 0.01 and 0.04 inches.

7. A method of adjusting the fluid flow through a flush valve comprising:
a) providing a flush valve comprising:
1) a valve body having an inlet and an outlet;
2) a valve seat formed in the body between the inlet and outlet;
3) a movable sealing arrangement above the valve seat defining a lower chamber in fluid communication with the inlet and an upper chamber, wherein in a closed position the movable sealing arrangement is urged against and seals the valve seat and wherein in an open position the movable sealing arrangement is relaxed and spaced from the valve seat such that the inlet is in fluid communication with the outlet;
4) a relief valve to relieve pressure, thereby allowing the movable sealing arrangement to displace from the valve seat to provide fluid communication between the inlet and the outlet, wherein the relief valve is comprised of a valve seat seal and a post longitudinally extending therefrom; and
5) a flush actuator assembly mounted upon the valve body to displace the relief valve post comprising:
i) a base having a bore extending therethrough, wherein the base has a central longitudinal axis, wherein the base is secured to the valve body and wherein the base includes external threads;
ii) a plunger rod having a central longitudinal axis passing therethrough, wherein the plunger rod is positioned within and guided by the bore of the base and wherein the plunger rod is positioned adjacent and transverse to the relief valve post;
iii) a movable handle for laterally moving the plunger rod to contact and displace the relief valve post thereby opening the relief valve wherein the movable handle is mounted to the base which when the handle is moved displaces the plunger rod within the bore and said handle comprises a face plate that coacts with the plunger rod and wherein the handle is pivotable causing the face plate to pivot and coact with the plunger rod;
(iv) an outer casing threadably secured to the external threads of said base; and
v) visual indicia disposed on and, at all times, non-movable relative to the outer casing on an external surface of said outer casing wherein during installation of said flush actuator assembly, said visual indicia identifies a non-axisymmetric orientation of the bore relative to the base central axis passing through the plunger rod such that the base may be positioned upon the valve body so that the plunger rod contacts the relief valve post at different locations of the post when the handle is displaced in a first direction thereby displacing the relief valve differing amounts and altering the volume of water passing through the valve for each flush cycle; and
b) adjusting the position of where the plunger rod contacts the relief valve post based upon a position of the visual indicia;
c) wherein the base may be positioned in different angular positions upon the valve body; and
d) wherein the bore has a central longitudinal axis and the base has a central longitudinal axis and wherein the bore central longitudinal axis from the base central longitudinal axis are offset between 0.01 and 0.04 inches.

* * * * *